United States Patent
Zhao et al.

(10) Patent No.: US 11,399,349 B2
(45) Date of Patent: Jul. 26, 2022

(54) POWER HEADROOM REPORTING PROCESSING METHOD, TERMINAL AND NETWORK SIDE DEVICE

(71) Applicant: CHINA ACADEMY OF TELECOMMUNICATIONS TECHNOLOGY, Beijing (CN)

(72) Inventors: Yali Zhao, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 26 days.

(21) Appl. No.: 16/959,991

(22) PCT Filed: Dec. 27, 2018

(86) PCT No.: PCT/CN2018/124272
§ 371 (c)(1),
(2) Date: Jul. 2, 2020

(87) PCT Pub. No.: WO2019/137229
PCT Pub. Date: Jul. 18, 2019

(65) Prior Publication Data
US 2021/0068061 A1 Mar. 4, 2021

(30) Foreign Application Priority Data

Jan. 11, 2018 (CN) .......................... 201810027440.4
Jan. 12, 2018 (CN) .......................... 201810032015.4

(51) Int. Cl.
*H04W 52/36* (2009.01)

(52) U.S. Cl.
CPC ................................. *H04W 52/365* (2013.01)

(58) Field of Classification Search
CPC .................................................... H04W 52/365
See application file for complete search history.

(56) References Cited

U.S. PATENT DOCUMENTS 9,844,009 B2 12/2017 Dinan
2010/0329204 A1 12/2010 Guo et al.
(Continued)

FOREIGN PATENT DOCUMENTS

CN 102083129 A 6/2011
CN 102104905 A 6/2011
(Continued)

OTHER PUBLICATIONS

First Office Action and search report from CN app. No. 201810032015.4, dated Mar. 19, 2020, with English translation provided by Global Dossier.
(Continued)

*Primary Examiner* — James P Duffy
(74) *Attorney, Agent, or Firm* — Ladas & Parry, LLP

(57) ABSTRACT

The disclosure provides a power headroom reporting processing method, a terminal and a network side device. The power headroom reporting processing method includes: reporting a power headroom reporting media access control element to a target network side device, where the terminal aggregates a plurality of network side devices of different versions, and the PHR MAC CE includes PH information of one or more cells, so that after receiving the PHR MAC CE, the target network side device reads PH information corresponding to a cell that is identified by the target network side device in the PHR MAC CE.

19 Claims, 5 Drawing Sheets

--- receiving, by a target network side device, a PHR MAC CE reported by a terminal, where the terminal aggregates multiple network side devices of different versions, and the PHR MAC CE includes PH information of one or more cells ⟶ 501 reading PH information corresponding to a cell that can be identified by the target network side device in the PHR MAC CE ⟶ 502

(56) References Cited

U.S. PATENT DOCUMENTS

| | | |
|---|---|---|
| 2013/0182658 A1 | 7/2013 | Xu et al. |
| 2013/0188570 A1 | 7/2013 | Zhao et al. |
| 2016/0309425 A1 | 10/2016 | Yi et al. |
| 2018/0007642 A1 | 1/2018 | Feuersaenger et al. |

FOREIGN PATENT DOCUMENTS

| | | |
|---|---|---|
| CN | 102118786 A | 7/2011 |
| JP | 2017-511047 A | 4/2017 |
| WO | 2015093768 A1 | 6/2015 |
| WO | 2015/137661 A1 | 9/2015 |

OTHER PUBLICATIONS

First Office Action from TW app. No. 108100956 dated Sep. 5, 2020, with machine English translation.

International Search Report from PCT/CN2018/124272, dated Feb. 27, 2019 with English translation from WIPO.

Written Opinion of the International Searching Authority from PCT/CN2018/124272, dated Feb. 27, 2019 with English translation from WIPO.

International Preliminary Report on Patentability from PCT/CN2018/124272, dated Jul. 14, 2020 with English translation from WIPO.

"PHR MAC CE format design and analysis of relevant issues", R2-105411, 3GPP TSG-RAN2#71bis, Xi'an, China, Oct. 11-15, 2010.

"Power headroom report MAC CE", R2-1712246, 3GPP TSG RAN WG2 #100, Reno, USA, Nov. 27-Dec. 1, 2017.

"Cell Index in EN-DC", R2-1712855, 3GPP TSG RAN WG2 #100, Reno, USA, Nov. 27-Dec. 1, 2017.

"Consideration on PHR for EN-DC", R2-1712909, revision of R2-1710767, 3GPP TSG RAN WG2 #100, Reno, USA, Nov. 27-Dec. 1, 2017.

"PHR MAC CE for EN-DC", R2-1800169, 3GPP TSG RAN WG2 #Adhoc, Vancouver, Canada, Jan. 22-26, 2018.

"Further clarification on PRC MAC CE for EN-DC", R2-1802150, 3GPP TSG-RAN WG2#101, Athens, Greece, Feb. 28-Mar. 2, 2018.

"Presentation of Specification/Report to TSG: TS 38.321, Version 2.0.0", RP-172419, 3GPP TSG-RAN Meeting #78, Lisbon, Portugal, Dec. 18-21, 2017.

"3rd Generation Partnership Project; Technical Specification Group Radio Access Network; NR; Medium Access Control (MAC) protocol specification (Release 15)", 3GPP TS 38.321, V2.0.0, Dec. 2017.

"3rd Generation Partnership Project; Technical Specification Group Radio Access Network; NR; Medium Access Control (MAC) protocol specification (Release 15)", 3GPP TS 38.321, V1.2.0, Dec. 2017.

Extended European Search Report from EP app. No. 18899442.0, dated Feb. 5, 2021.

"Ambiguous CC Bitmap Length for EN-DC PHR MAC CE", R2-1807008, 3GPP TSG-RAN WG2#102, Busan, Korea, May 21-25, 2018.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.0.0, Dec. 2017.

Notice of Reasons for Refusal from JP app. No. 2020-538621, dated Aug. 17, 2021, with English translation provided by Global Dossier, all pages.

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (type 2, PCell)} |
| R | R | \multicolumn{6}{c}{$P_{CMAX,c}$ 1} |
| P | V | \multicolumn{6}{c}{PH (type 2, PSCell or PUCCH SCell)} |
| R | R | \multicolumn{6}{c}{$P_{CMAX,c}$ 2} |
| P | V | \multicolumn{6}{c}{PH (type X, PCell)} |
| R | R | \multicolumn{6}{c}{$P_{CMAX,c}$ 3} |
| P | V | \multicolumn{6}{c}{PH (type X, Scell 1)} |
| R | R | \multicolumn{6}{c}{$P_{CMAX,c}$ 4} |
| \multicolumn{8}{c}{......} |
| P | V | \multicolumn{6}{c}{PH (type X, Scell n)} |
| R | R | \multicolumn{6}{c}{$P_{CMAX,c}$ m} |

Fig. 3

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (type 2, PCell) | | | | | |
| R | R | $P_{CMAX,c}$ 1 | | | | | |
| P | V | PH (type 2, PSCell or PUCCH SCell) | | | | | |
| R | R | $P_{CMAX,c}$ 2 | | | | | |
| P | V | PH (type X, PCell) | | | | | |
| R | R | $P_{CMAX,c}$ 3 | | | | | |
| P | V | PH (type X, Scell 1) | | | | | |
| R | R | $P_{CMAX,c}$ 4 | | | | | |
| ...... | | | | | | | |
| P | V | PH (type X, Scell n) | | | | | |
| R | R | $P_{CMAX,c}$ m | | | | | |

Fig. 4 reporting a PHR MAC CE to a target network side device, where the terminal aggregates multiple network side devices of different versions, and the PHR MAC CE includes PH information of one or more cells, so that after receiving the PHR MAC CE, the target network side device reads PH information corresponding to a cell that can be identified by the target network side device in the PHR MAC CE  ⌢ 801

Fig. 8

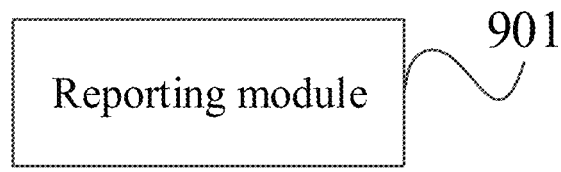

Fig. 9

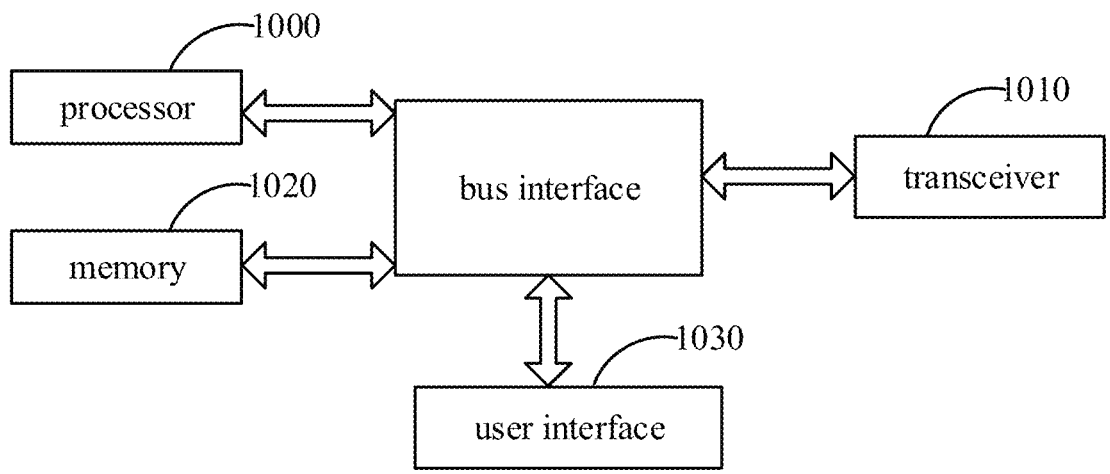

Fig. 10

POWER HEADROOM REPORTING PROCESSING METHOD, TERMINAL AND NETWORK SIDE DEVICE

CROSS-REFERENCE TO RELATED APPLICATIONS

The present application is the U.S. national phase of PCT Application No. PCT/CN2018/124272 filed on Dec. 27, 2018, which claims priority to the Chinese patent application No. 201810027440.4 filed on Jan. 11, 2018 and the Chinese patent application No. 201810032015.4 filed on Jan. 12, 2018, the disclosures of which are incorporated herein by reference in their entireties.

TECHNICAL FIELD

The present disclosure relates to the field of communication technology, in particular to a Power Headroom Reporting (PHR) processing method, a terminal and a network side device.

BACKGROUND

FIG. 1 shows a possible multi-layer network coverage scenario. In FIG. 1, a non-ideal logical interface is used between a Long Term Evolution (LTE) base station eNB and a New Radio (NR) base station gNB. The terminal can simultaneously aggregate the resources of LTE eNB and NR gNB, namely EUTRAN and NR Dual Connectivity (EN-DC).

Under EN-DC, the base stations aggregated by the terminal are divided into a master node (MN) and a secondary node (SN) based on the different functions of the base station aggregated by the terminal. The cell index allocation method under EN-DC is as follows.

The MN is responsible for coordinating the cell index range that can be used by the MN and the SN. The MN determines the cell index range that can be used by the SN and informs the SN. MN and SN can use different cell index ranges.

Each of MN and SN select an appropriate cell index from the cell index range that can be used by the MN or SN and assign it to the UE.

The above cell index allocation method can ensure that the cell index of the UE is uniquely numbered, and there is no conflict between the cell indexes allocated by the MN and the SN.

PHR means that the terminal reports power headroom information to the network side to assist the network side to perform uplink scheduling. When the PHR trigger condition is met, the terminal will trigger the PHR. PHR implements reporting using a Power Headroom MAC Control Element (PHR MAC CE).

NR defines three PHR MAC CE formats, namely:

Single entry PHR MAC CE: PHR MAC CE includes only the power headroom (PH) information of one cell (as shown in FIG. 2).

Multiple entry PHR MAC CE: PHR MAC CE includes PH information of multiple cells. Based on whether the number of cells with uplink (UL) carriers configured by the UE is less than 8, two multiple entry PHR MAC CE format are given (as shown in FIGS. 3 and 4). The main difference between these two PHR MAC CE formats is the number of bytes occupied by the carrier bitmap indication in PHR MAC CE.

Based on the cell index allocation mechanism in the EN-DC scenario in the related art, one base station aggregated by a terminal cannot determine which cell index allocated by another base station corresponds to which cell under the other base station. In this case, the base station cannot correctly identify the correspondence between the cell and the PH information after receiving the power headroom reported by the terminal.

SUMMARY

An embodiment of the present disclosure provides a power headroom reporting (PHR) processing method, including: reporting a power headroom reporting media access control element (PHR MAC CE) to a target network side device, wherein the terminal aggregates a plurality of network side devices of different versions, and the PHR MAC CE includes PH information of one or more cells, so that after receiving the PHR MAC CE, the target network side device reads PH information corresponding to a cell that is identified by the target network side device in the PHR MAC CE.

In an embodiment of the present disclosure, the PHR MAC CE comprises PH information of all cells configured or activated for the terminal.

In an embodiment of the present disclosure, the method further includes: for a multiple entry PHR MAC CE, using different logical channel identifiers (LCIDs) to represent multiple entry PHR MAC CEs with different lengths of component carrier (CC) bitmaps.

In an embodiment of the present disclosure, the PHR MAC CE includes only PH information of a cell that is identifiable by the target network side device in all cells configured or activated for the terminal.

In an embodiment of the present disclosure, the cell that is identifiable by the target network side device includes a cell configured by the target network side device for the terminal or a cell configured and activated by the target network side device for the terminal.

In an embodiment of the present disclosure, when the target network side device is a master node (MN) of the terminal, the PHR MAC CE includes only PH information of a serving cell of the target network side in all cells configured or activated for the terminal.

In an embodiment of the present disclosure, when the target network side device is a secondary node (SN) of the terminal, the PHR MAC CE includes only PH information of a primary serving cell (Pcell) of the terminal or a serving cell of the target network side in all cells configured or activated for the terminal.

In an embodiment of the present disclosure, wherein the terminal aggregates a plurality of network side devices of different versions includes: the plurality of network side devices aggregated by the terminal use different types of radio access technologies (RATs); or the plurality of network side devices aggregated by the terminal use the same type of RAT, and protocol versions used by the plurality of network side devices are different.

An embodiment of the present disclosure provides a terminal, including: a reporting module, configured to report a power headroom reporting media access control element (PHR MAC CE) to a target network side device, wherein the terminal aggregates a plurality of network side devices of different versions, and the PHR MAC CE includes PH information of one or more cells, so that after receiving the PHR MAC CE, the target network side device reads PH information corresponding to a cell that is identifiable by the target network side device in the PHR MAC CE.

In an embodiment of the present disclosure, the terminal aggregates a plurality of network side devices of different versions includes: the plurality of network side devices aggregated by the terminal use different types of radio access technologies (RATs); or the plurality of network side devices aggregated by the terminal use the same type of RAT, and protocol versions used by the plurality of network side devices are different.

An embodiment of the present disclosure provides a terminal, including: a transceiver, a memory, a processor, a user interface, a bus interface, and a program stored on the memory, and executed by the processor, wherein, the transceiver is used to report a power headroom reporting media access control element (PHR MAC CE) to a target network side device, wherein the terminal aggregates a plurality of network side devices of different versions, and the PHR MAC CE includes PH information of one or more cells, so that after receiving the PHR MAC CE, the target network side device reads PH information corresponding to a cell that is identifiable by the target network side device in the PHR MAC CE.

In an embodiment of the present disclosure, the PHR MAC CE includes PH information of all cells configured or activated for the terminal.

In an embodiment of the present disclosure, the processor is used to read the program in the memory and perform the following step: for a multiple entry PHR MAC CE, using different logical channel identifiers (LCIDs) to represent multiple entry PHR MAC CEs with different lengths of CC bitmaps.

In an embodiment of the present disclosure, the PHR MAC CE includes only PH information of a cell that is identifiable by the target network side device in all cells configured or activated for the terminal.

In an embodiment of the present disclosure, the cell that is identifiable by the target network side device includes a cell configured by the target network side device for the terminal or a cell configured and activated by the target network side device for the terminal.

In an embodiment of the present disclosure, when the target network side device is a MN of the terminal, the PHR MAC CE includes only PH information of a serving cell of the target network side in all cells configured or activated for the terminal.

In an embodiment of the present disclosure, when the target network side device is a SN of the terminal, the PHR MAC CE includes only PH information of a primary serving cell (Pcell) of the terminal or a serving cell of the target network side in all cells configured or activated for the terminal; or when the target network side device is the SN of the terminal, the PHR MAC CE includes only PH information of the serving cell of the target network side in all cells configured or activated for the terminal.

In an embodiment of the present disclosure, the terminal aggregates a plurality of network side devices of different versions includes: the plurality of network side devices aggregated by the terminal use different types of radio access technologies (RATs); or the plurality of network side devices aggregated by the terminal use the same type of RAT, and protocol versions used by the plurality of network side devices are different.

An embodiment of the present disclosure provides a computer readable storage medium, on which a computer program is stored, and the computer program is executed by the processor to implement the PHR processing method.

An embodiment of the present disclosure provides a power headroom reporting (PHR) processing method, including: receiving, by a target network side device, a power headroom reporting media access control element (PHR MAC CE) reported by a terminal, wherein the terminal aggregates a plurality of network side devices of different versions, and the PHR MAC CE includes PH information of one or more cells; and reading PH information corresponding to a cell that is identifiable by the target network side device in the PHR MAC CE.

In an embodiment of the present disclosure, the PHR MAC CE includes PH information of all cells configured or activated for the terminal.

In an embodiment of the present disclosure, the PHR MAC CE includes only PH information of a cell that is identifiable by the target network side device in all cells configured or activated for the terminal.

In an embodiment of the present disclosure, the method further includes: ignoring PH information corresponding to a cell that cannot be identified by the target network side device in the PHR MAC CE.

In an embodiment of the present disclosure, the reading PH information corresponding to a cell that is identifiable by the target network side device in the PHR MAC CE includes: determining a length of a component carrier (CC) bitmap in the PHR MAC CE; and reading a value of each bit in the CC bitmap based on the length of the CC bitmap, and then reading the PH information corresponding to the cell that is identifiable by the target network side device in the PHR MAC CE based on the value of each bit.

In an embodiment of the present disclosure, the determining a length of a component carrier (CC) bitmap in the PHR MAC CE includes: determining whether the PHR MAC CE belongs to a multiple entry PHR MAC CE based on a logical channel identifier (LCID) included in a MAC sub-header corresponding to the received PHR MAC CE; if yes, for the PHR MAC CE, performing blind detection on the length of CC bitmap based on CC bitmap lengths of 1 byte and 4 bytes respectively, and determining the length of the CC bitmap based on a blind detection result.

In an embodiment of the present disclosure, the determining a length of a component carrier (CC) bitmap in the PHR MAC CE includes: determining whether the PHR MAC CE belongs to a multiple entry PHR MAC CE based on the LCID included in the MAC sub-header corresponding to the received PHR MAC CE; if yes, determining a maximum cell number of the terminal based on a cell number configured for the terminal by the target network side device and a cell number configured for the terminal by other network side devices aggregated by the terminal acquired in advance, or a maximum cell number configured for the terminal by the other network side devices.

In an embodiment of the present disclosure, the determining a length of a component carrier (CC) bitmap in the PHR MAC CE includes: determining the length of CC bitmap in the PHR MAC CE based on the LCID included in the MAC sub-header corresponding to the received PHR MAC CE, wherein for a multiple entry PHR MAC CE, different LCIDs represent multiple entry PHR MAC CEs having different lengths of CC bitmap.

In an embodiment of the present disclosure, when the target network side device is a MN of the terminal, the PHR MAC CE includes only PH information of a serving cell of the target network side in all cells configured or activated for the terminal.

In an embodiment of the present disclosure, the reading PH information corresponding to a cell that is identifiable by the target network side device in the PHR MAC CE includes: reading corresponding PH information in the PHR MAC CE based on a CC number allocated by the target network side device to the terminal.

In an embodiment of the present disclosure, when the target network side device is a SN of the terminal, the PHR MAC CE includes only PH information of a primary serving cell (Pcell) of the terminal or a serving cell of the target network side in all cells configured or activated for the terminal; or when the target network side device is the SN of the terminal, the PHR MAC CE includes only PH information of the serving cell of the target network side in all cells configured or activated for the terminal.

In an embodiment of the present disclosure, when the PHR MAC CE includes only the PH information of the PCell of the terminal and the serving cell of the target network side device in all cells configured or activated for the terminal, the reading PH information corresponding to a cell that is identifiable by the target network side device in the PHR MAC CE includes: ignoring the PH information corresponding to the PCell; reading the corresponding PH information in the PHR MAC CE based on the CC number allocated by the target network side device to the terminal; and when the PHR MAC CE includes only PH information of the serving cell of the target network side device in all cells configured or activated for the terminal, the reading PH information corresponding to a cell that is identifiable by the target network side device in the PHR MAC CE comprises: reading the corresponding PH information in the PHR MAC CE based on the CC number allocated by the target network side device to the terminal.

In an embodiment of the present disclosure, the terminal aggregates a plurality of network side devices of different versions includes: the plurality of network side devices aggregated by the terminal use different types of radio access technologies (RATs); or the plurality of network side devices aggregated by the terminal use the same type of RAT, and protocol versions used by the plurality of network side devices are different.

An embodiment of the present disclosure provides a network side device, including: a receiving module, configured to receive, by a target network side device, a power headroom reporting media access control element (PHR MAC CE) reported by a terminal, wherein the terminal aggregates a plurality of network side devices of different versions, and the PHR MAC CE includes PH information of one or more cells; and a reading module, configured to read PH information corresponding to a cell that is identifiable by the target network side device in the PHR MAC CE.

In an embodiment of the present disclosure, the terminal aggregates a plurality of network side devices of different versions includes: the plurality of network side devices aggregated by the terminal use different types of radio access technologies (RATs); or the plurality of network side devices aggregated by the terminal use the same type of RAT, and protocol versions used by the plurality of network side devices are different.

An embodiment of the present disclosure provides a network side device, including a transceiver, a memory, a processor, a bus interface, and a program stored on the memory and executed by the processor, wherein, the transceiver is used for the target network side device to receive a power headroom reporting media access control element (PHR MAC CE) reported by a terminal, wherein the terminal aggregates a plurality network side devices of different versions, and the PHR MAC CE includes PH information of one or more cells; and the processor is used to read the computer program stored on the memory to implement: reading PH information corresponding to a cell that is identifiable by the target network side device in the PHR MAC CE.

In an embodiment of the present disclosure, the PHR MAC CE includes PH information of all cells configured or activated for the terminal.

In an embodiment of the present disclosure, the PHR MAC CE includes only PH information of a cell that is identifiable by the target network side device in all cells configured or activated for the terminal.

In an embodiment of the present disclosure, the processor is further configured to ignore the PH information corresponding to the cell that cannot be identified by the target network side device in the PHR MAC CE.

In an embodiment of the present disclosure, the processor is further used to determine a length of a component carrier (CC) bitmap in the PHR MAC CE; and read a value of each bit in the CC bitmap based on the length of the CC bitmap, and then read the PH information corresponding to the cell that is identifiable by the target network side device in the PHR MAC CE based on the value of each bit.

In an embodiment of the present disclosure, the processor is further configured to determine whether the PHR MAC CE belongs to a multiple entry PHR MAC CE based on a logical channel identifier (LCID) included in a MAC sub-header corresponding to the received PHR MAC CE; and if yes, for the PHR MAC CE, perform blind detection on the length of CC bitmap based on CC bitmap lengths of 1 byte and 4 bytes respectively, and determine the length of the CC bitmap based on a blind detection result.

In an embodiment of the present disclosure, the processor is further configured to determine whether the PHR MAC CE belongs to a multiple entry PHR MAC CE based on the LCID included in the MAC sub-header corresponding to the received PHR MAC CE; if yes, determine a maximum cell number of the terminal based on a cell number configured for the terminal by the target network side device and a cell number configured for the terminal by other network side devices aggregated by the terminal acquired in advance, or a maximum cell number configured for the terminal by the other network side devices; and determine the length of CC bitmap in the PHR MAC CE based on the maximum cell number of the terminal.

In an embodiment of the present disclosure, the processor is further configured to determine the length of CC bitmap in the PHR MAC CE based on the LCID included in the MAC sub-header corresponding to the received PHR MAC CE; wherein for a multiple entry PHR MAC CE, different LCIDs represent multiple entry PHR MAC CEs having different lengths of CC bitmaps.

In an embodiment of the present disclosure, when the target network side device is the MN of the terminal, the PHR MAC CE includes only PH information of a serving cell of the target network side in all cells configured or activated for the terminal.

In an embodiment of the present disclosure, the processor is further configured to read corresponding PH information in the PHR MAC CE based on a CC number allocated by the target network side device to the terminal.

In an embodiment of the present disclosure, when the target network side device is a SN of the terminal, the PHR MAC CE includes only PH information of a primary serving cell (Pcell) of the terminal or a serving cell of the target network side in all cells configured or activated for the terminal; or when the target network side device is the SN of the terminal, the PHR MAC CE includes only PH information of a serving cell of the target network side in all cells configured or activated for the terminal.

In an embodiment of the present disclosure, when the PHR MAC CE includes only the PH information of the PCell of the terminal and the serving cell of the target network side device in all cells configured or activated for the terminal, the processor is further configured to ignore the PH information corresponding to the primary serving cell; read the corresponding PH information in the PHR MAC CE based on the CC number allocated by the target network side device to the terminal; when the PHR MAC CE includes only PH information of the serving cell of the target network side device in all cells configured or activated for the terminal, the processor is further configured to read the corresponding PH information in the PHR MAC CE based on the CC number allocated by the target network side device to the terminal.

In an embodiment of the present disclosure, the terminal aggregates a plurality of network side devices of different versions includes: the plurality of network side devices aggregated by the terminal use different types of radio access technologies (RATs); or the plurality of network side devices aggregated by the terminal use the same type of RAT, and protocol versions used by the plurality of network side devices are different.

An embodiment of the present disclosure provides a computer readable storage medium, on which a computer program is stored, and the computer program is executed by the processor to implement the PHR processing method.

BRIEF DESCRIPTION OF THE DRAWINGS

FIG. 3 is a schematic diagram of a multiple entry PHR MAC CE format;

FIG. 4 is another schematic diagram of a multiple entry PHR MAC CE format;

FIG. 8 is a flowchart of a PHR processing method applied to a terminal according an embodiment of the present disclosure;

FIG. 9 is a schematic structural diagram of a terminal according to an embodiment of the present disclosure; and FIG. 10 is another schematic structural diagram of a terminal according to an embodiment of the present disclosure.

DETAILED DESCRIPTION

To make the technical solutions and features of the present disclosure more clear, the following will describe in detail with reference to the accompanying drawings and specific embodiments.

Figures 1, 2:
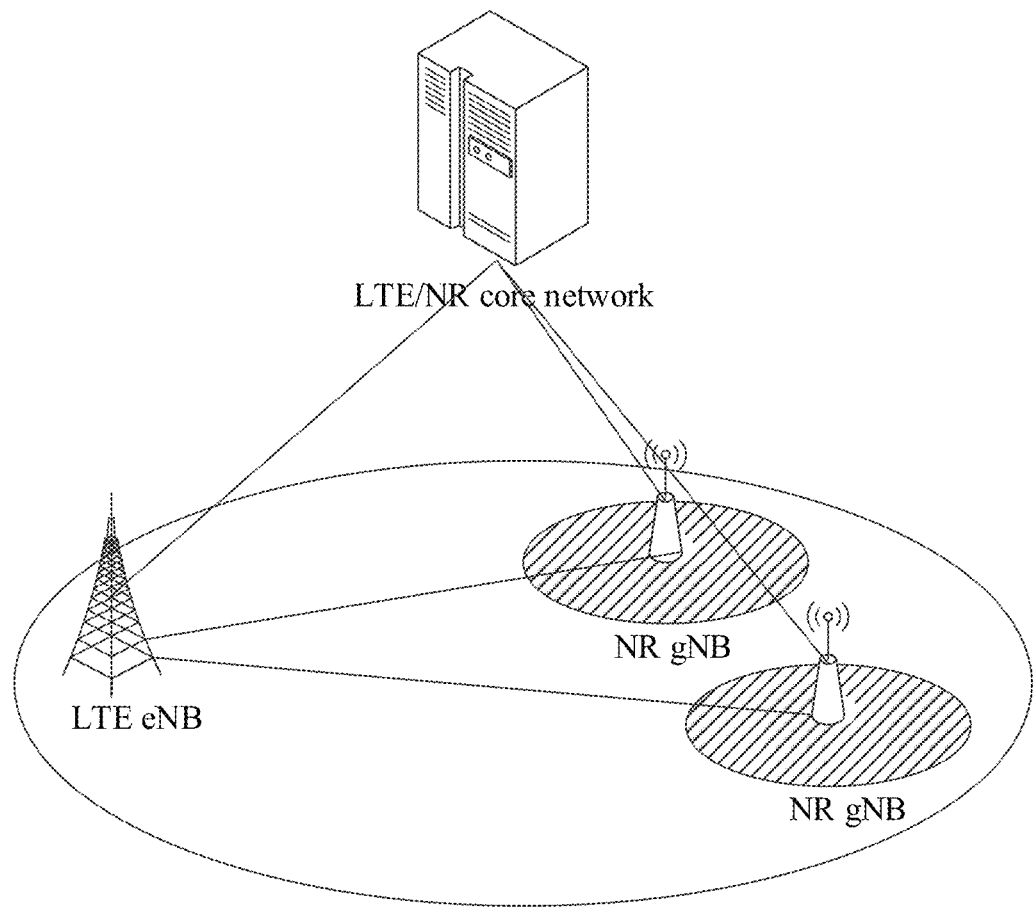
FIG. 1 is a schematic diagram of a network coverage scenario.
FIG. 2 is a schematic diagram of a single entry PHR MAC CE format.
Figure 5:
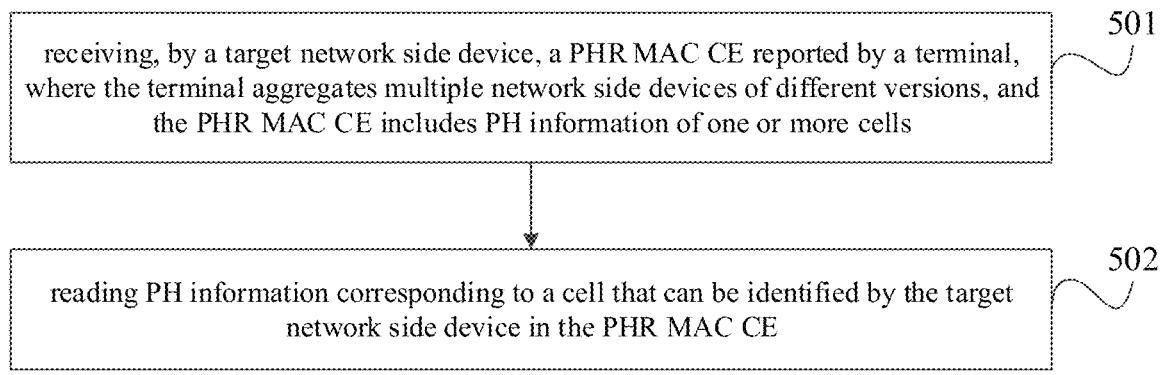
FIG. 5 is a flowchart of a PHR processing method applied to a network side device according an embodiment of the present disclosure.

In some embodiments of the present disclosure, referring to FIG. 5, a PHR processing method includes the following steps.

Step 501: receiving, by a target network side device, a power headroom reporting media access control element (PHR MAC CE) reported by a terminal, where the terminal aggregates multiple network side devices of different versions, and the PHR MAC CE includes PH information of one or more cells.

For example, the terminal aggregates multiple network side devices of different versions means that, the multiple network side devices aggregated by the terminal use different types of radio access technology (RAT); or the multiple network side devices aggregated by the terminal use the same type of RAT, but the protocol versions used by the multiple network side devices are different.

The target network side device refers to any network side device aggregated by the terminal.

The network side device mentioned in the present disclosure may be a base station, or another network side device having a function similar to a base station.

Step 502: reading PH information corresponding to a cell that is identifiable by the target network side device in the PHR MAC CE.

Here, the target network side device receives the PHR MAC CE sent by the terminal, and only reads the PH information corresponding to the cell that it can identify.

In the PHR processing method of the embodiment of the present disclosure, when the terminal aggregates multiple network side devices of different versions, each network side device only processes the PH information corresponding to the cell that it can identify, ensuring that the network side device can correctly identify the correspondence between the cell and the PH information after receiving the power headroom reported by the terminal, which ensures that the network side device can acquire the correct PH information.

As a first optional implementation, the PHR MAC CE includes PH information of all cells configured or activated for the terminal.

At this time, when the terminal reports the PHR MAC CE to each network side device, the PHR MAC CE includes PH information of all cells configured or activated for the terminal. After the network side device receives the PHR, if the PHR includes a cell number that it cannot be identified by the network side device, the PH information corresponding to the cell number is ignored.

Based on this, the method further includes the following step.

Step 503: ignoring the PH information corresponding to the cell that cannot be identified by the target network side device in the PHR MAC CE.

At this time, the target network side device receives the PHR MAC CE reported by the terminal. The PHR MAC CE includes PH information of all cells configured or activated for the terminal. The target network side device can ignore the PH information corresponding to the cell that it cannot recognize and only read the PH information corresponding to the cell that it can recognize, thereby ensuring that the network side device can acquire the correct PH information.

As a second optional implementation, the PHR MAC CE includes only PH information of a cell that is identifiable by the target network side device in all cells configured or activated for the terminal.

At this time, when the terminal reports the PHR MAC CE to each network side device, the PHR MAC CE only includes PH information corresponding to the cell that is identifiable by the network side device in all the cells configured or activated for the terminal. After the network side device receives the PHR, it can read the PH information corresponding to the cell that is identifiable by itself, thereby ensuring that the network side device can acquire the correct PH information.

Optionally, the cell that is identifiable by the target network side device includes a cell configured by the target network side device for the terminal or configured and activated for the terminal.

Based on the first implementation, the above step 502 includes the following steps.

Step 5021: determining a length of a component carrier (CC) bitmap in the PHR MAC CE.

Step 5022: reading a value of each bit in the CC bitmap based on the length of the CC bitmap, and then reading the PH information corresponding to the cell that is identifiable by the target network side device in the PHR MAC CE based on the value of each bit.

At this time, the target network side device receives the PHR MAC CE reported by the terminal, firstly determines the length of the CC bitmap in the PHR MAC CE, then reads the value of each bit in the CC bitmap based on the length of the CC bitmap, and then reads the PH information corresponding to the cell that is identifiable by the target network side device in the PHR MAC CE based on the value of each bit, thereby ensuring that the network side device can acquire the correct PH information.

Among them, in order that the network side device determines the length of the CC bitmap in the PHR MAC CE, there are several ways as follows.

Way 1:

Optionally, the step 5021 includes the following steps.

Step 50211: determining whether the PHR MAC CE belongs to a multiple entry PHR MAC CE based on a logical channel identifier (LCID) included in a MAC sub-header corresponding to the received PHR MAC CE.

Step 50212, if yes, performing blind detection on the CC bitmap length based on the CC bitmap length of 1 byte and 4 bytes respectively for the PHR MAC CE, and determining the length of the CC bitmap based on a blind detection result.

At this time, the target network side device receives the PHR MAC CE reported by the terminal, and firstly determines whether it is single entry PHR MAC CE or multiple entry PHR MAC CE based on the value of the LCID of the MAC sub-header corresponding to the PHR MAC CE MAC CE. If it is a multiple entry PHR MAC CE, then the target network side device blindly detects the length of CC bitmap in PHR MAC CE based on a CC bitmap length of 1 byte and 4 bytes respectively, so as to determine the length of CC bitmap.

Way 2:

Optionally, the step 5021 includes the following steps.

Step 50213, determining whether the PHR MAC CE belongs to a multiple entry PHR MAC CE based on the LCID included in the MAC sub-header corresponding to the received PHR MAC CE.

Step 50214, if yes, determining a maximum cell number of the terminal based on a cell number configured for the terminal by the target network side device and a cell number configured for the terminal by other network side devices aggregated by the terminal acquired in advance, or a maximum cell number configured for the terminal by other network side devices.

Here, the network side devices aggregated by the terminals interact all cell numbers or maximum cell numbers configured for the terminals by themselves respectively through interfaces between the network side devices.

Step 50215: determining the CC bitmap length in the PHR MAC CE based on the maximum cell number of the terminal.

Here, the number of cells can be determined based on the maximum cell number of the terminal, and the length of the CC bitmap can be determined based on the number of cells. For example, when the number of cells is less than 8, the length of the CC bitmap is 1 byte, and when the number of cells is greater than 8, the length of the CC bitmap is 4 bytes.

At this time, the target network side device receives the PHR MAC CE reported by the terminal, and firstly determines whether it is single entry PHR MAC CE or multiple entry PHR MAC CE based on the value of the LCID. If it is multiple entry PHR MAC CE, then the target network side device determines the maximum cell number of the terminal based on the cell number configured for the terminal by itself and other network side devices aggregated by the terminal or the maximum cell number configured by other network side devices for the terminal, thereby determining the CC bitmap length in the PHR MAC CE is 1 byte or 4 bytes.

Way 3:

Optionally, the above step 5021 includes the following steps.

Step 50216: determining the CC bitmap length in the PHR MAC CE based on the LCID included in the MAC sub-header corresponding to the received PHR MAC CE; wherein for multiple entry PHR MAC CE, different LCIDs represent multiple entry PHR MAC CE having different CC bitmap lengths.

Here, two LCID values are introduced for the multiple entry PHR MAC CE, which are used to indicate that the CC bitmap length in the multiple entry PHR MAC CE is 1 byte and 4 bytes, respectively.

At this time, the MAC sub-header corresponding to the PHR MAC CE includes at least two LCIDs. One LCID is used to indicate whether the PHR MAC CE is single entry PHR MAC CE or multiple entry PHR MAC CE, and the other LCID is used to indicate the CC bitmap length in multiple entry PHR MAC CE is 1 byte or 4 bytes.

At this time, the target network side device receives the PHR MAC CE reported by the terminal, and firstly determines whether it is a single entry PHR MAC CE or a multiple entry PHR MAC CE based on one value of LCID. If it is multiple entry PHR MAC CE, then determines whether the CC bitmap length in PHR MAC CE is 1 byte or 4 bytes base on the other value of LCID.

Based on the second implementation, when the target network side device is the MN of the terminal, the PHR MAC CE includes only PH information of a serving cell of the target network side in all cells configured or activated for the terminal.

At this time, when the terminal reports the PHR MAC CE to the MN, the PHR MAC CE includes only the PH information of the serving cell of the MN.

Optionally, the above step 502 includes the following steps.

Step 5023: reading corresponding PH information in the PHR MAC CE based on the CC number allocated by the target network side device to the terminal.

At this time, after the target network side device (MN) receives the PHR MAC CE, the PHR MAC CE includes only the PH information of the serving cell of MN, and the MN reads the corresponding PH information based on the CC number allocated to the terminal by itself.

Based on the second implementation, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

At this time, when the terminal reports the PHR MAC CE to the SN, there may be two implementation. One is that the PHR MAC CE includes only the PH information of the PCell and the serving cell corresponding to the SN; the other is the PHR MAC CE only includes the PH information of the serving cell corresponding to the SN.

Optionally, when the PHR MAC CE includes only the PH information of the PCell of the terminal and the serving cell of the target network side device in all cells configured or activated for the terminal, the above step 502 includes the following steps.

Step 5024: ignoring the PH information corresponding to the primary serving cell;

Step 5025: reading the corresponding PH information in the PHR MAC CE based on the CC number allocated by the target network side device to the terminal.

At this time, after the target network side device (SN) receives the PHR MAC CE, the PHR MAC CE only includes the PH information of the PCell and the serving cell of the SN, and the SN ignores the PH information corresponding to the PCell and read the corresponding PH information based on the CC number allocated by the SN to the terminal.

When the PHR MAC CE includes only PH information of the serving cell of the target network side device in all cells configured or activated for the terminal, the above step 502 includes the following steps.

Step 5026: reading the corresponding PH information in the PHR MAC CE based on the CC number allocated by the target network side device to the terminal.

At this time, after the target network side device (SN) receives the PHR MAC CE, the PHR MAC CE includes only the PH information of the serving cell of SN, and the SN reads the corresponding PH information based on the CC number allocated to the terminal by the SN.

Taking the network side devices aggregated by the terminal use two base stations using different RATs, such as one for LTE eNB and one for NR gNB (i.e., EN-DC scenario) as an example, specific application examples are illustrated as follows.

Application Example One

Step 1: The terminal accesses a network, and the network configures an EN-DC working mode for the terminal based on the service requirements of the terminal. MN and SN configure serving cells for the terminals, respectively, and allocate cell numbers corresponding to the respective serving cells.

Step 2: The terminal determines that there is a PHR trigger, and when the terminal reports the PHR MAC CE to each base station, the PHR MAC CE includes PH information of all cells configured or activated for the terminal. In addition, when the number of cells aggregated by the terminal is less than 8, the terminal uses the PHR MAC CE format in FIG. 3 for PHR reporting; otherwise, it uses the PHR MAC CE format in FIG. 4 for PHR reporting.

Step 3: The base station processes the received PHR.

The base station determines the length of the CC bitmap in the PHR MAC CE based on the following ways.

Way 1: After receiving the PHR MAC CE reported by the terminal, the base station firstly determines whether it is a single entry PHR MAC CE or a multiple entry PHR MAC CE based on the value of the LCID included in the MAC sub-header corresponding to the PHR MAC CE. If it is multiple entry PHR MAC CE, the base station then determines the length of the PHR MAC CE based on a length of an L field of the MAC sub-header corresponding to the PHR MAC CE, and then implements a blind detection on the length of the CC bitmap in the PHR MAC CE based on the length of the PHR MAC CE by taking the length of the CC bitmap of 1 byte and 4 bytes respectively.

Way 2: The base stations aggregated by the terminal interact the maximum cell number configured for the terminal with each other through the interface between the base stations to. After receiving the PHR MAC CE reported by the terminal, the base station firstly determines whether it is a single entry PHR MAC CE or a multiple entry PHR MAC CE based on the value of the LCID included in the MAC sub-header corresponding to the PHR MAC CE. When it is multiple entry PHR MAC CE, the base station determines the maximum cell number of the terminal based on the maximum cell number configured for the terminal by itself and other base stations aggregated by the terminal, thereby determining whether the CC bitmap length in the PHR MAC CE is 1 byte or 4 bytes.

Way 3: Two LCID values are introduced for the multiple entry PHR MAC CE, which are used to indicate that the length of the CC bitmap in the multiple entry PHR MAC CE is 1 byte and 4 bytes. After receiving the PHR MAC CE reported by the terminal, the base station firstly determines the single entry PHR MAC CE or multiple entry PHR MAC CE based on the value of an LCID. In the case of multiple entry PHR MAC CE, the base station determines the length of the CC bitmap in the PHR MAC CE is 1 byte or 4 bytes based on the value of the other LCID.

The base station ignores the PH information corresponding to the cell that it cannot recognize, and after determining the CC bitmap length, reads the corresponding PH information based on the CC number allocated to the terminal by itself.

Application Example Two

Step 1: The terminal accesses the network, and the network configures an EN-DC working mode for the terminal based on the service requirements of the terminal. MN and SN configure serving cells for the terminals, respectively, and allocate cell numbers corresponding to the respective serving cells.

Step 2: The terminal determines that there is a PHR trigger, and when the number of cells aggregated by the terminal is less than 8, the terminal uses the PHR MAC CE format in FIG. 3 for PHR reporting, otherwise uses the PHR MAC CE format in FIG. 4 for PHR reporting.

When the terminal reports the PHR MAC CE to each base station, the PHR MAC CE includes only PH information of cells that is identifiable by the respective base station in all cells configured or activated for the terminal. That is, when the terminal reports the PHR MAC CE to the MN, the PHR MAC CE includes only the PH information of the serving cell corresponding to the MN.

When the terminal reports the PHR MAC CE to the SN, the PHR MAC CE can be processed in two ways.

Way 1: PHR MAC CE only includes the PH information of PCell and the serving cell corresponding to SN.

Way 2: PHR MAC CE only includes PH information of the serving cell corresponding to SN.

Step 3: The base station processes the received PHR.

After receiving the PHR MAC CE, the base station firstly determines whether it is single entry PHR MAC CE or multiple entry PHR MAC CE based on the value of the LCID.

If it is multiple entry PHR MAC CE, then for the MN, the base station reads the corresponding PH information according to the CC number allocated to the terminal by the base station; and for SN, if the way 1 is used in step 2, the SN ignores the PH information corresponding to PCell, and then reads the corresponding PH information based on the CC number allocated to the terminal by the SN; if the way 2 is used in step 2, the SN reads the corresponding PH information based on the CC number allocated to the terminal by the SN.

In the PHR processing method of the embodiment of the present disclosure, when the terminal aggregates multiple network side devices of different versions, each network side device only processes the PH information corresponding to the cell that it can identify, ensuring that the network side device can correctly identify the correspondence between the cell and the PH information after receiving the power headroom reported by the terminal, which ensures that the network side device can acquire the correct PH information.

Figure 6:
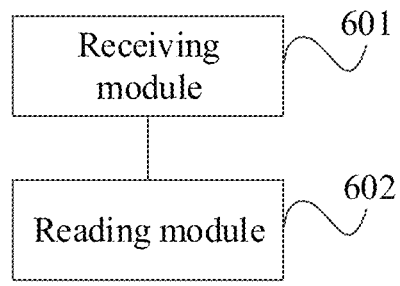
FIG. 6 is a schematic structural diagram of a network side device according to an embodiment of the present disclosure.

In some embodiments of the present disclosure, referring to FIG. 6, a network side device is also provided, including: a receiving module 601, configured to receive, by a target network side device, a power headroom reporting media access control element (PHR MAC CE) reported by a terminal, where the terminal aggregates multiple network side devices of different versions, and the PHR MAC CE includes PH information of one or more cells; and a reading module 602, configured to read PH information corresponding to a cell that is identifiable by the target network side device in the PHR MAC CE.

In the network side device of the embodiment of the present disclosure, when the terminal aggregates multiple network side devices of different versions, each network side device only processes the PH information corresponding to the cell that it can identify, ensuring that the network side device can correctly identify the correspondence between the cell and the PH information after receiving the power headroom reported by the terminal, which ensures that the network side device can acquire the correct PH information.

Optionally, the PHR MAC CE includes PH information of all cells configured or activated for the terminal.

Optionally, the PHR MAC CE includes only PH information of a cell that is identifiable by the target network side device in all cells configured or activated for the terminal.

Optionally, the cell that can identified by the target network side device includes a cell configured by the target network side device for the terminal or configured and activated for the terminal.

Optionally, the network side device further includes: an ignoring module, configured to ignore the PH information corresponding to the cell that cannot be identified by the target network side device in the PHR MAC CE.

Optionally, the reading module 602 includes: a determining sub-module, configured to determine a length of a component carrier (CC) bitmap in the PHR MAC CE; and a first reading sub-module, configured to read a value of each bit in the CC bitmap based on the length of the CC bitmap, and then read the PH information corresponding to the cell that is identifiable by the target network side device in the PHR MAC CE based on the value of each bit.

Optionally, the determining sub-module includes: a first determining unit, configured to determine whether the PHR MAC CE belongs to a multiple entry PHR MAC CE based on a logical channel identifier (LCID) included in a MAC sub-header corresponding to the received PHR MAC CE; and a second determining unit, configured to, if yes, perform blind detection on the CC bitmap length based on the CC bitmap length of 1 byte and 4 bytes respectively for the PHR MAC CE, and determining the length of the CC bitmap based on a blind detection result.

Optionally, the determining sub-module includes: a third determining unit, configured to determine whether the PHR MAC CE belongs to a multiple entry PHR MAC CE based on the LCID included in the MAC sub-header corresponding to the received PHR MAC CE; a fourth determining unit, configured to, if yes, determine a maximum cell number of the terminal based on a cell number configured for the terminal by the target network side device and a cell number configured for the terminal by other network side devices aggregated by the terminal acquired in advance, or a maximum cell number configured for the terminal by other network side devices; and a fifth determining unit, configured to determine the CC bitmap length in the PHR MAC CE based on the maximum cell number of the terminal.

Optionally, the determining sub-module includes: a sixth determining unit, configured to determine the CC bitmap length in the PHR MAC CE based on the LCID included in the MAC sub-header corresponding to the received PHR MAC CE; wherein for multiple entry PHR MAC CE, different LCIDs represent multiple entry PHR MAC CE having different CC bitmap lengths.

Optionally, when the target network side device is the MN of the terminal, the PHR MAC CE includes only PH information of a serving cell of the target network side in all cells configured or activated for the terminal.

Optionally, the reading module 602 includes: a second reading sub-module, configured to read corresponding PH information in the PHR MAC CE based on the CC number allocated by the target network side device to the terminal.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

Optionally, when the PHR MAC CE includes only the PH information of the PCell of the terminal and the serving cell of the target network side device in all cells configured or activated for the terminal, the reading module 602 includes: an ignoring sub-module, configured to ignore the PH information corresponding to the primary serving cell; a third reading sub-module, configured to read the corresponding PH information in the PHR MAC CE based on the CC number allocated by the target network side device to the terminal.

When the PHR MAC CE includes only PH information of the serving cell of the target network side device in all cells configured or activated for the terminal, the reading module 602 includes: a fourth reading sub-module, configured to read the corresponding PH information in the PHR MAC CE based on the CC number allocated by the target network side device to the terminal.

Optionally, multiple network side devices aggregated by the terminal use different RAT types; or the multiple network side devices aggregated by the terminal use the same RAT type, but the protocol versions used by the multiple network side devices are different.

In the network side device of the embodiment of the present disclosure, when the terminal aggregates multiple network side devices of different versions, each network side device only processes the PH information corresponding to the cell that it can identify, ensuring that the network side device can correctly identify the correspondence between the cell and the PH information after receiving the power headroom reported by the terminal, which ensures that the network side device can acquire the correct PH information.

It should be noted that all the implementations in the above embodiments of the PHR processing method are applicable to the embodiment of the network side device, and the same technical effect can also be achieved.

Figure 7:
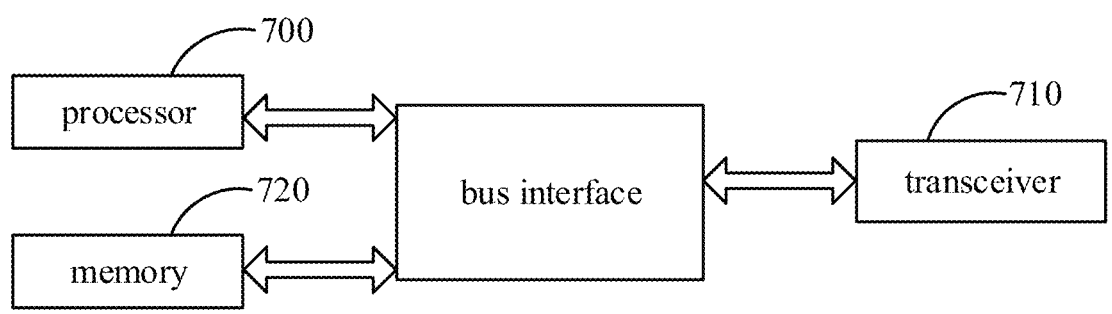
FIG. 7 is another schematic structural diagram of a network side device according to an embodiment of the present disclosure.

In some embodiments of the present disclosure, as shown in FIG. 7, a network side device is also provided, which includes a transceiver 710, a memory 720, a processor 700, a bus interface, and a program stored on the memory 720 and executed by the processor 700.

The transceiver 710 is used for the target network side device to receive a power headroom reporting media access control element (PHR MAC CE) reported by a terminal, where the terminal aggregates multiple network side devices of different versions, and the PHR MAC CE includes PH information of one or more cells; and the processor 700 is used to read PH information corresponding to a cell that is identifiable by the target network side device in the PHR MAC CE.

In FIG. 7, the bus architecture may include any number of interconnected buses and bridges, various circuits, specifically one or more processors represented by the processor 700 and the memory represented by the memory 720 are linked together. The bus architecture can also link various other circuits such as peripheral devices, voltage regulators, and power management circuits, etc., which are well known in the art, and therefore, they will not be further described in this disclosure. The bus interface provides an interface. The transceiver 710 may be a plurality of elements, including a transmitter and a transceiver, and provides a unit for communicating with various other devices on a transmission medium. The processor 700 is used for managing the bus architecture and general processing, and the memory 720 may store data used by the processor 700 to perform the operations.

Optionally, the PHR MAC CE includes PH information of all cells configured or activated for the terminal.

Optionally, the PHR MAC CE includes only PH information of a cell that is identifiable by the target network side device in all cells configured or activated for the terminal.

Optionally, the cell that can identified by the target network side device includes a cell configured by the target network side device for the terminal or configured and activated for the terminal.

Optionally, the processor 700 is further configured to ignore the PH information corresponding to the cell that cannot be identified by the target network side device in the PHR MAC CE.

Optionally, the processor 700 is further used to determine a length of a component carrier (CC) bitmap in the PHR MAC CE; and read a value of each bit in the CC bitmap based on the length of the CC bitmap, and then read the PH information corresponding to the cell that is identifiable by the target network side device in the PHR MAC CE based on the value of each bit.

Optionally, the processor 700 is further configured to determine whether the PHR MAC CE belongs to a multiple entry PHR MAC CE based on a logical channel identifier (LCID) included in a MAC sub-header corresponding to the received PHR MAC CE; and if yes, perform blind detection on the CC bitmap length based on the CC bitmap length of 1 byte and 4 bytes respectively for the PHR MAC CE, and determine the length of the CC bitmap based on a blind detection result.

Optionally, the processor 700 is further configured to determine whether the PHR MAC CE belongs to a multiple entry PHR MAC CE based on the LCID included in the MAC sub-header corresponding to the received PHR MAC CE; if yes, determine a maximum cell number of the terminal based on a cell number configured for the terminal by the target network side device and a cell number configured for the terminal by other network side devices aggregated by the terminal acquired in advance, or a maximum cell number configured for the terminal by other network side devices; and determine the CC bitmap length in the PHR MAC CE based on the maximum cell number of the terminal.

Optionally, the processor 700 is further configured to determine the CC bitmap length in the PHR MAC CE based on the LCID included in the MAC sub-header corresponding to the received PHR MAC CE; wherein for multiple entry PHR MAC CE, different LCIDs represent multiple entry PHR MAC CE having different CC bitmap lengths.

Optionally, when the target network side device is the MN of the terminal, the PHR MAC CE includes only PH information of a serving cell of the target network side in all cells configured or activated for the terminal.

Optionally, the processor 700 is further configured to read corresponding PH information in the PHR MAC CE based on the CC number allocated by the target network side device to the terminal.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

Optionally, when the PHR MAC CE includes only the PH information of the PCell of the terminal and the serving cell of the target network side device in all cells configured or activated for the terminal, the processor 700 is further configured to ignore the PH information corresponding to the primary serving cell; read the corresponding PH information in the PHR MAC CE based on the CC number allocated by the target network side device to the terminal.

When the PHR MAC CE includes only PH information of the serving cell of the target network side device in all cells configured or activated for the terminal, the processor 700 is further configured to read the corresponding PH information in the PHR MAC CE based on the CC number allocated by the target network side device to the terminal.

Optionally, multiple network side devices aggregated by the terminal use different RAT types; or the multiple network side devices aggregated by the terminal use the same RAT type, but the protocol versions used by the multiple network side devices are different.

In some embodiments of the present disclosure, a computer readable storage medium is also provided, on which a computer program is stored, and when the program is executed by the processor, the following steps are implemented.

The target network side device receives a power headroom reporting media access control element (PHR MAC CE) reported by a terminal, where the terminal aggregates multiple network side devices of different versions, and the PHR MAC CE includes PH information of one or more cells; and PH information corresponding to a cell that is identifiable by the target network side device in the PHR MAC CE is read.

Optionally, the PHR MAC CE includes PH information of all cells configured or activated for the terminal.

Optionally, the PHR MAC CE includes only PH information of a cell that is identifiable by the target network side device in all cells configured or activated for the terminal.

Optionally, the cell that can identified by the target network side device includes a cell configured by the target network side device for the terminal or configured and activated for the terminal.

Optionally, when the program is executed by the processor, the following steps are also implemented: ignoring the PH information corresponding to the cell that cannot be identified by the target network side device in the PHR MAC CE.

Optionally, when the program is executed by the processor, the following steps are also implemented: determining a length of a component carrier (CC) bitmap in the PHR MAC CE; and reading a value of each bit in the CC bitmap based on the length of the CC bitmap, and then reading the PH information corresponding to the cell that is identifiable by the target network side device in the PHR MAC CE based on the value of each bit.

Optionally, when the program is executed by the processor, the following steps are also implemented: determining whether the PHR MAC CE belongs to a multiple entry PHR MAC CE based on a logical channel identifier (LCID) included in a MAC sub-header corresponding to the received PHR MAC CE; and if yes, performing blind detection on the CC bitmap length based on the CC bitmap length of 1 byte and 4 bytes respectively for the PHR MAC CE, and determining the length of the CC bitmap based on a blind detection result.

Optionally, when the program is executed by the processor, the following steps are also implemented: determining whether the PHR MAC CE belongs to a multiple entry PHR MAC CE based on the LCID included in the MAC sub-header corresponding to the received PHR MAC CE; if yes, determining a maximum cell number of the terminal based on a cell number configured for the terminal by the target network side device and a cell number configured for the terminal by other network side devices aggregated by the terminal acquired in advance, or a maximum cell number configured for the terminal by other network side devices; and determining the CC bitmap length in the PHR MAC CE based on the maximum cell number of the terminal.

Optionally, when the program is executed by the processor, the following steps are also implemented: determining the CC bitmap length in the PHR MAC CE based on the LCID included in the MAC sub-header corresponding to the received PHR MAC CE; wherein for multiple entry PHR MAC CE, different LCIDs represent multiple entry PHR MAC CE having different CC bitmap lengths.

Optionally, when the target network side device is the MN of the terminal, the PHR MAC CE includes only PH information of a serving cell of the target network side in all cells configured or activated for the terminal.

Optionally, when the program is executed by the processor, the following steps are also implemented: reading corresponding PH information in the PHR MAC CE based on the CC number allocated by the target network side device to the terminal.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

Optionally, when the PHR MAC CE includes only the PH information of the PCell of the terminal and the serving cell of the target network side device in all cells configured or activated for the terminal, the program is executed by the processor, the following steps are also implemented: ignoring the PH information corresponding to the primary serving cell; reading the corresponding PH information in the PHR MAC CE based on the CC number allocated by the target network side device to the terminal. When the PHR MAC CE includes only PH information of the serving cell of the target network side device in all cells configured or activated for the terminal, the program is executed by the processor, the following steps are also implemented: reading the corresponding PH information in the PHR MAC CE based on the CC number allocated by the target network side device to the terminal.

Optionally, multiple network side devices aggregated by the terminal use different RAT types; or the multiple network side devices aggregated by the terminal use the same RAT type, but the protocol versions used by the multiple network side devices are different.

In some embodiments of the present disclosure, referring to FIG. 8, a PDH processing method is also provided, which includes the following steps.

Step 801: reporting a power headroom media access control element (PHR MAC CE) to a target network side device, where the terminal aggregates multiple network side devices of different versions, and the PHR MAC CE includes PH information of one or more cells, so that after receiving the PHR MAC CE, the target network side device reads PH information corresponding to a cell that is identifiable by the target network side device in the PHR MAC CE.

For example, the terminal aggregates multiple network side devices of different versions means that, the multiple network side devices aggregated by the terminal use different types of radio access technology (RAT); or the multiple network side devices aggregated by the terminal use the same type of RAT, but the protocol versions used by the multiple network side devices are different.

In the PHR processing method of the embodiment of the present disclosure, when the terminal aggregates multiple network side devices of different versions, the terminal reports the PHR MAC CE to the network side device, and each network side device only processes the PH information corresponding to the cell that it can identify, ensuring that the network side device can correctly identify the correspondence between the cell and the PH information after receiving the power headroom reported by the terminal, which ensures that the network side device can acquire the correct PH information.

As a first optional implementation manner, the PHR MAC CE includes PH information of all cells configured or activated for the terminal.

At this time, when the terminal reports the PHR MAC CE to each network side device, the PHR MAC CE includes PH information of all cells configured or activated for the terminal. After the network side device receives the PHR, if the PHR includes a cell number that it cannot be identified by the network side device, the PH information corresponding to the cell number is ignored.

Optionally, the method further includes the following steps.

Step 802: for multiple entry PHR MAC CE, using different logical channel identifiers (LCID) to represent multiple entry PHR MAC CE with different lengths of CC bitmaps.

Here, two LCID values are introduced for the multiple entry PHR MAC CE, which are used to indicate that the CC bitmap length in the multiple entry PHR MAC CE is 1 byte and 4 bytes, respectively.

At this time, the MAC sub-header corresponding to the PHR MAC CE includes at least two LCIDs. One LCID is used to indicate whether the PHR MAC CE is single entry PHR MAC CE or multiple entry PHR MAC CE, and the other LCID is used to indicate the CC bitmap length in multiple entry PHR MAC CE is 1 byte or 4 bytes.

At this time, the target network side device receives the PHR MAC CE reported by the terminal, and firstly determines whether it is a single entry PHR MAC CE or a multiple entry PHR MAC CE based on one value of LCID. If it is multiple entry PHR MAC CE, then determines whether the CC bitmap length in PHR MAC CE is 1 byte or 4 bytes base on the other value of LCID.

As another optional implementation, the PHR MAC CE includes only PH information of a cell that is identifiable by the target network side device in all cells configured or activated for the terminal.

At this time, when the terminal reports the PHR MAC CE to each network side device, the PHR MAC CE only includes PH information corresponding to the cell that is identifiable by the network side device in all the cells configured or activated for the terminal. After receiving the PHR, the network side device reads the PH information corresponding to the cell that is identifiable by itself, thereby ensuring that the network side device can acquire the correct PH information.

Optionally, the cell that is identifiable by the target network side device includes a cell configured by the target network side device for the terminal or configured and activated for the terminal.

Optionally, when the target network side device is the MN of the terminal, the PHR MAC CE includes only PH information of a serving cell of the target network side in all cells configured or activated for the terminal.

At this time, when the terminal reports the PHR MAC CE to the MN, the PHR MAC CE includes only the PH information of the serving cell of the MN.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

At this time, when the terminal reports the PHR MAC CE to the SN, there may be two implementation. One is that the PHR MAC CE includes only the PH information of the PCell and the serving cell corresponding to the SN; the other is the PHR MAC CE only includes the PH information of the serving cell corresponding to the SN.

In the PHR processing method of the embodiment of the present disclosure, when the terminal aggregates multiple network side devices of different versions, the terminal reports the PHR MAC CE to the network side device, and each network side device only processes the PH information corresponding to the cell that it can identify, thereby ensuring that the network side device can correctly identify the correspondence between the cell and the PH information after receiving the power headroom reported by the terminal, and ensuring that the network side device can acquire the correct PH information.

In some embodiments of the present disclosure, referring to FIG. 9, a terminal is also provided, which includes: a reporting module 901, configured to report a power headroom reporting media access control element (PHR MAC CE) to a target network side device, where the terminal aggregates multiple network side devices of different versions, and the PHR MAC CE includes PH information of one or more cells, so that after receiving the PHR MAC CE, the target network side device reads PH information corresponding to a cell that is identifiable by the target network side device in the PHR MAC CE.

In the terminal of the embodiment of the present disclosure, when the terminal aggregates multiple network side devices of different versions, the terminal reports the PHR MAC CE to the network side device, and each network side device only processes the PH information corresponding to the cell that it can identify, thereby ensuring that after receiving the power headroom reported by the terminal, the network side device can correctly identify the correspondence between the cell and the PH information, ensuring that the network side device can acquire the correct PH information.

Optionally, the PHR MAC CE includes PH information of all cells configured or activated for the terminal.

Optionally, the terminal further includes: an instructing module, configured to, for multiple entry PHR MAC CE, use different logical channel identifiers (LCID) to represent multiple entry PHR MAC CE with different lengths of CC bitmaps.

Optionally, the PHR MAC CE includes only PH information of a cell that is identifiable by the target network side device in all cells configured or activated for the terminal.

Optionally, the cell that the target network side device can identify includes a cell configured by the target network side device for the terminal or configured and activated for the terminal.

Optionally, when the target network side device is the MN of the terminal, the PHR MAC CE includes only PH information of a serving cell of the target network side in all cells configured or activated for the terminal.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

Optionally, multiple network side devices aggregated by the terminal use different RAT types; or the multiple network side devices aggregated by the terminal use the same RAT type, but the protocol versions used by the multiple network side devices are different.

In the terminal of the embodiment of the present disclosure, when the terminal aggregates multiple network side devices of different versions, the terminal reports the PHR MAC CE to the network side device, and each network side device only processes the PH information corresponding to the cell that it can identify, thereby ensuring that after receiving the power headroom reported by the terminal, the network side device can correctly identify the correspondence between the cell and the PH information, ensuring that the network side device can acquire the correct PH information.

It should be noted that all the implementations in the above-mentioned PHR processing method embodiment are applicable to the terminal embodiment, and the same technical effect can also be achieved.

In some embodiments of the present disclosure, as shown in FIG. 10, a terminal is also provided, including a transceiver 1010, a memory 1020, a processor 1000, a user interface 1030, a bus interface, and a program stored on the memory 1020, and executed by the processor 1000.

The transceiver 1010 is used to report a power headroom reporting media access control element (PHR MAC CE) to a target network side device, where the terminal aggregates multiple network side devices of different versions, and the PHR MAC CE includes PH information of one or more cells, so that after receiving the PHR MAC CE, the target network side device reads PH information corresponding to a cell that is identifiable by the target network side device in the PHR MAC CE.

Among them, in FIG. 10, the bus architecture may include any number of interconnected buses and bridges, various circuits, specifically one or more processors represented by the processor 1000 and the memory represented by the memory 1020 are linked together. The bus architecture can also link various other circuits such as peripheral devices, voltage regulators, and power management circuits, etc., which are well known in the art, and therefore, they will not be further described in this disclosure. The bus interface provides an interface. The transceiver 1010 may be a plurality of elements, including a transmitter and a transceiver, providing a unit for communicating with various other devices on a transmission medium. For different user devices, the user interface 1030 may also be an interface that can be externally connected to a desired device. The connected devices include but are not limited to a keypad, a display, a speaker, a microphone, a joystick, and the like.

The processor 1000 is used for managing the bus architecture and general processing, and the memory 1020 may store data used by the processor 1000 to perform the operations.

Optionally, the PHR MAC CE includes PH information of all cells configured or activated for the terminal.

Optionally, the processor is used to read the program in the memory and perform the following steps: for multiple entry PHR MAC CE, using different logical channel identifiers (LCID) to represent multiple entry PHR MAC CE with different lengths of CC bitmaps.

Optionally, the PHR MAC CE includes only PH information of a cell that is identifiable by the target network side device in all cells configured or activated for the terminal.

Optionally, the cell that the target network side device can identify includes a cell configured by the target network side device for the terminal or configured and activated for the terminal.

Optionally, when the target network side device is the MN of the terminal, the PHR MAC CE includes only PH information of a serving cell of the target network side in all cells configured or activated for the terminal.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

Optionally, multiple network side devices aggregated by the terminal use different RAT types; or the multiple network side devices aggregated by the terminal use the same RAT type, but the protocol versions used by the multiple network side devices are different.

In some embodiments of the present disclosure, a computer readable storage medium is also provided, on which a computer program is stored, and when the program is executed by the processor, the following steps are implemented.

The PHR MAC CE is reported to the target network side device, where the terminal aggregates multiple network side devices of different versions, and the PHR MAC CE includes PH information of one or more cells, so that after receiving the PHR MAC CE, the network side device reads the PH information corresponding to the cell that is identifiable by the target network side device in the PHR MAC CE.

Optionally, the PHR MAC CE includes PH information of all cells configured or activated for the terminal.

Optionally, when the program is executed by the processor, the following steps are also implemented: for multiple entry multiple entry PHR MAC CE, using different logical channel identifiers (LCID) to represent multiple entry PHR MAC CE with different length of CC bitmaps.

Optionally, the PHR MAC CE includes only PH information of cells that is identifiable by the target network side device in all cells configured or activated for the terminal.

Optionally, the cell that the target network side device can identify includes a cell configured by the target network side device for the terminal or configured and activated for the terminal.

Optionally, when the target network side device is the MN of the terminal, the PHR MAC CE includes only PH information of a serving cell of the target network side in all cells configured or activated for the terminal.

Optionally, when the target network side device is the SN of the terminal, the PHR MAC CE includes only PH information of a primary serving cell (Pcell) of the terminal or a serving cell of the target network side in all cells configured or activated for the terminal.

Alternatively, when the target network side device is the SN of the terminal, the PHR MAC CE includes only PH information of a serving cell of the target network side in all cells configured or activated for the terminal.

Optionally, multiple network side devices aggregated by the terminal use different RAT types; or the multiple network side devices aggregated by the terminal use the same RAT type, but the protocol versions used by the multiple network side devices are different.

In the various embodiments of the present disclosure, it should be understood that the value of the sequence numbers of the above processes does not mean the order of execution, and the execution order of each process should be determined by its function and inherent logic, and should not construct any limitation on the embodiments of the present disclosure.

Unless otherwise defined, the technical or scientific terms used herein shall have the usual meanings understood by those of ordinary skill in the field to which this disclosure belongs. The terms "first", "second" and similar words used in the specification and claims of this disclosure do not indicate any order, quantity or importance, but are only used to distinguish different components. "Multiple" means that there are at least two.

It will be apparent to those skilled in the art that various modifications and variations can be made to the embodiments of the disclosure without departing from the spirit and scope of the disclosure. Thus, any modifications and variations of the embodiments of the disclosure are within the scope of the claims of the disclosure and their equivalents, the disclosure is also intended to include such modifications and variations.

What is claimed is:

1. A power headroom reporting (PHR) processing method, comprising:
   reporting a power headroom reporting media access control element (PHR MAC CE) to a target network side device,
   wherein a terminal aggregates a plurality of network side devices of different versions, and the PHR MAC CE includes PH information of one or more cells;
   wherein the method further comprises:
   for a multiple entry PHR MAC CE, using different logical channel identifiers (LCIDs) to represent multiple entry PHR MAC CEs with different lengths of component carrier (CC) bitmaps.

2. The method according to claim 1, wherein the PHR MAC CE comprises PH information of all cells configured or activated for the terminal.

3. The method according to claim 1, wherein the PHR MAC CE includes only PH information of a cell that is identifiable by the target network side device in all cells configured or activated for the terminal.

4. The method according to claim 3, wherein the cell that is identifiable by the target network side device includes a cell configured by the target network side device for the terminal or a cell configured and activated by the target network side device for the terminal.

5. The method according to claim 3, wherein when the target network side device is a master node (MN) of the terminal, the PHR MAC CE includes only PH information of a serving cell of the target network side in all cells configured or activated for the terminal; or
   wherein when the target network side device is a secondary node (SN) of the terminal, the PHR MAC CE includes only PH information of a primary serving cell (Pcell) of the terminal or a serving cell of the target network side in all cells configured or activated for the terminal.

6. The method according to claim 1, wherein the terminal aggregates a plurality of network side devices of different versions comprises:
   the plurality of network side devices aggregated by the terminal use different types of radio access technologies (RATs); or the plurality of network side devices aggregated by the terminal use the same type of RAT, and protocol versions used by the plurality of network side devices are different.

7. A terminal, comprising a transceiver, a memory, a processor, a user interface, a bus interface, and a program stored on the memory, and executed by the processor, wherein,
   the transceiver is used to report a power headroom reporting media access control element (PHR MAC CE) to a target network side device, wherein the terminal aggregates a plurality of network side devices of different versions, and the PHR MAC CE includes PH information of one or more cells;
   wherein the processor is used to read the program in the memory and perform the following step:
   for a multiple entry PHR MAC CE, using different logical channel identifiers (LCIDs) to represent multiple entry PHR MAC CEs with different lengths of CC bitmaps.

8. The terminal according to claim 7, wherein the PHR MAC CE includes PH information of all cells configured or activated for the terminal.

9. The terminal according to claim 7, wherein the PHR MAC CE includes only PH information of a cell that is identifiable by the target network side device in all cells configured or activated for the terminal.

10. The terminal according to claim 9, wherein the cell that is identifiable by the target network side device includes a cell configured by the target network side device for the terminal or a cell configured and activated by the target network side device for the terminal; or wherein when the target network side device is a MN of the terminal, the PHR MAC CE includes only PH information of a serving cell of the target network side in all cells configured or activated for the terminal; or
    wherein when the target network side device is a SN of the terminal, the PHR MAC CE includes only PH information of a primary serving cell (Pcell) of the terminal or a serving cell of the target network side in all cells configured or activated for the terminal; or
    when the target network side device is the SN of the terminal, the PHR MAC CE includes only PH information of the serving cell of the target network side in all cells configured or activated for the terminal.

11. The terminal according to claim 7, wherein the terminal aggregates a plurality of network side devices of different versions comprises:
    the plurality of network side devices aggregated by the terminal use different types of radio access technologies (RATs); or the plurality of network side devices aggregated by the terminal use the same type of RAT, and protocol versions used by the plurality of network side devices are different.

12. A power headroom reporting (PHR) processing method, comprising:
    receiving, by a target network side device, a power headroom reporting media access control element (PHR MAC CE) reported by a terminal, wherein the terminal aggregates a plurality of network side devices of different versions, and the PHR MAC CE includes PH information of one or more cells; and
    reading PH information corresponding to a cell that is identifiable by the target network side device in the PHR MAC CE;
    wherein for a multiple entry PHR MAC CE, different LCIDs represent multiple entry PHR MAC CEs having different lengths of CC bitmap.

13. The method according to claim 12, wherein the PHR MAC CE includes PH information of all cells configured or activated for the terminal; or
wherein the PHR MAC CE includes only PH information of a cell that is identifiable by the target network side device in all cells configured or activated for the terminal.

14. The method according to claim 13, further comprising:
ignoring PH information corresponding to a cell that cannot be identified by the target network side device in the PHR MAC CE.

15. The method according to claim 13, wherein the reading PH information corresponding to a cell that is identifiable by the target network side device in the PHR MAC CE comprises:
determining a length of a component carrier (CC) bitmap in the PHR MAC CE; and
reading a value of each bit in the CC bitmap based on the length of the CC bitmap, and then reading the PH information corresponding to the cell that is identifiable by the target network side device in the PHR MAC CE based on the value of each bit.

16. The method according to claim 15, wherein the determining a length of a component carrier (CC) bitmap in the PHR MAC CE comprises:
determining whether the PHR MAC CE belongs to a multiple entry PHR MAC CE based on a logical channel identifier (LCID) included in a MAC sub-header corresponding to the received PHR MAC CE;
if yes, for the PHR MAC CE, performing blind detection on the length of CC bitmap based on CC bitmap lengths of 1 byte and 4 bytes respectively, and determining the length of the CC bitmap based on a blind detection result; or
wherein the determining a length of a component carrier (CC) bitmap in the PHR MAC CE comprises:
determining whether the PHR MAC CE belongs to a multiple entry PHR MAC CE based on the LCID included in the MAC sub-header corresponding to the received PHR MAC CE;
if yes, determining a maximum cell number of the terminal based on a cell number configured for the terminal by the target network side device and a cell number configured for the terminal by other network side devices aggregated by the terminal acquired in advance, or a maximum cell number configured for the terminal by the other network side devices; or
wherein the determining a length of a component carrier (CC) bitmap in the PHR MAC CE comprises:
determining the length of CC bitmap in the PHR MAC CE based on the LCID included in the MAC sub-header corresponding to the received PHR MAC CE.

17. The method according to claim 13, wherein when the target network side device is a MN of the terminal, the PHR MAC CE includes only PH information of a serving cell of the target network side in all cells configured or activated for the terminal;
wherein the reading PH information corresponding to a cell that is identifiable by the target network side device in the PHR MAC CE comprises:
reading corresponding PH information in the PHR MAC CE based on a CC number allocated by the target network side device to the terminal.

18. The method according to claim 13, wherein when the target network side device is a SN of the terminal, the PHR MAC CE includes only PH information of a primary serving cell (Pcell) of the terminal or a serving cell of the target network side in all cells configured or activated for the terminal; or
when the target network side device is the SN of the terminal, the PHR MAC CE includes only PH information of the serving cell of the target network side in all cells configured or activated for the terminal;
wherein when the PHR MAC CE includes only the PH information of the PCell of the terminal and the serving cell of the target network side device in all cells configured or activated for the terminal, the reading PH information corresponding to a cell that is identifiable by the target network side device in the PHR MAC CE comprises:
ignoring the PH information corresponding to the PCell;
reading the corresponding PH information in the PHR MAC CE based on the CC number allocated by the target network side device to the terminal; and
when the PHR MAC CE includes only PH information of the serving cell of the target network side device in all cells configured or activated for the terminal, the reading PH information corresponding to a cell that is identifiable by the target network side device in the PHR MAC CE comprises:
reading the corresponding PH information in the PHR MAC CE based on the CC number allocated by the target network side device to the terminal.

19. A network side device, comprising a transceiver, a memory, a processor, a bus interface, and a program stored on the memory and executed by the processor to implement the PHR processing method according to claim 12.

* * * * *